Sept. 18, 1956 P. B. PLACE 2,763,245
DRUM INTERNAL FOR LOW HEAD BOILER
Filed March 22, 1952 3 Sheets-Sheet 3
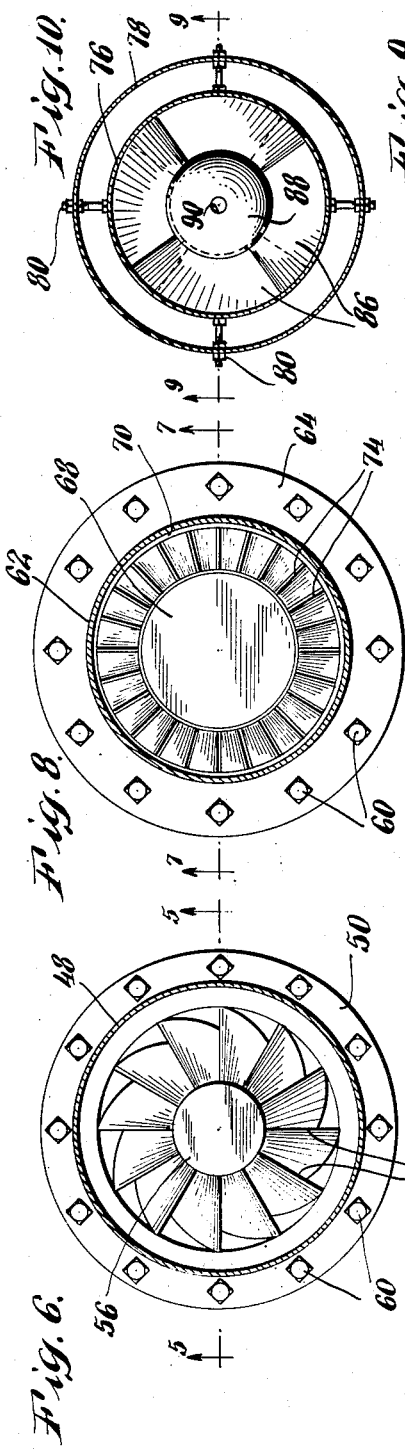
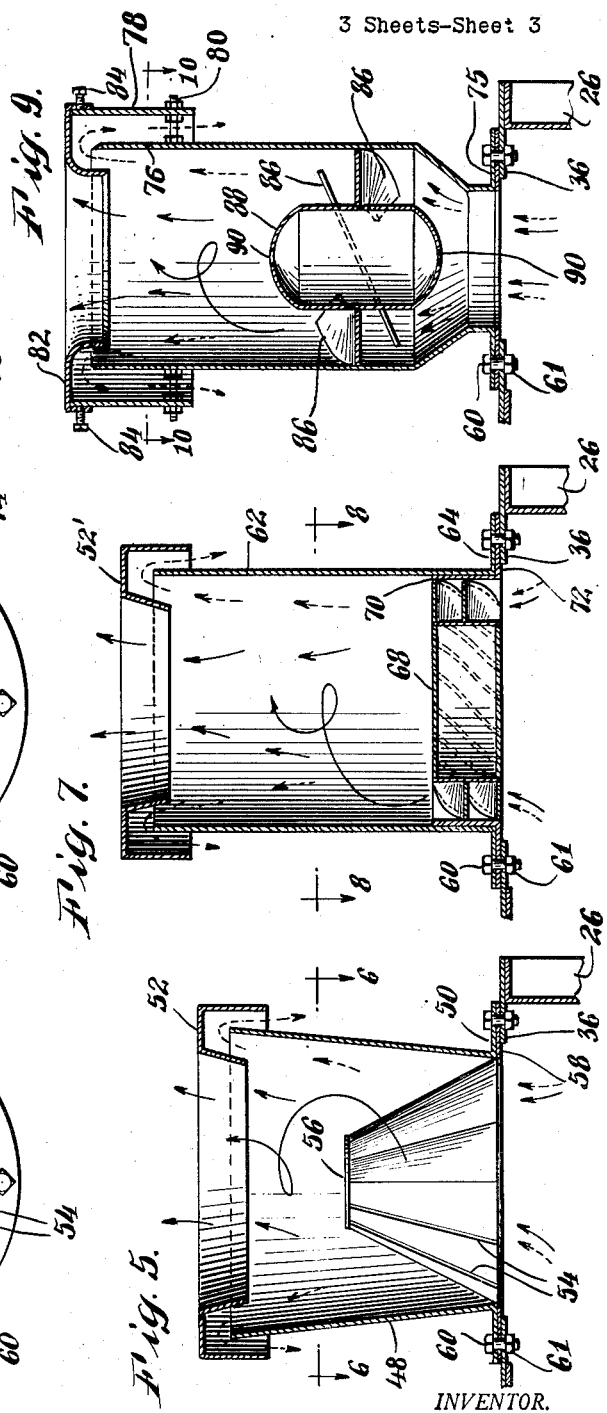
INVENTOR.
Palmer B. Place
BY
ATTORNEY.

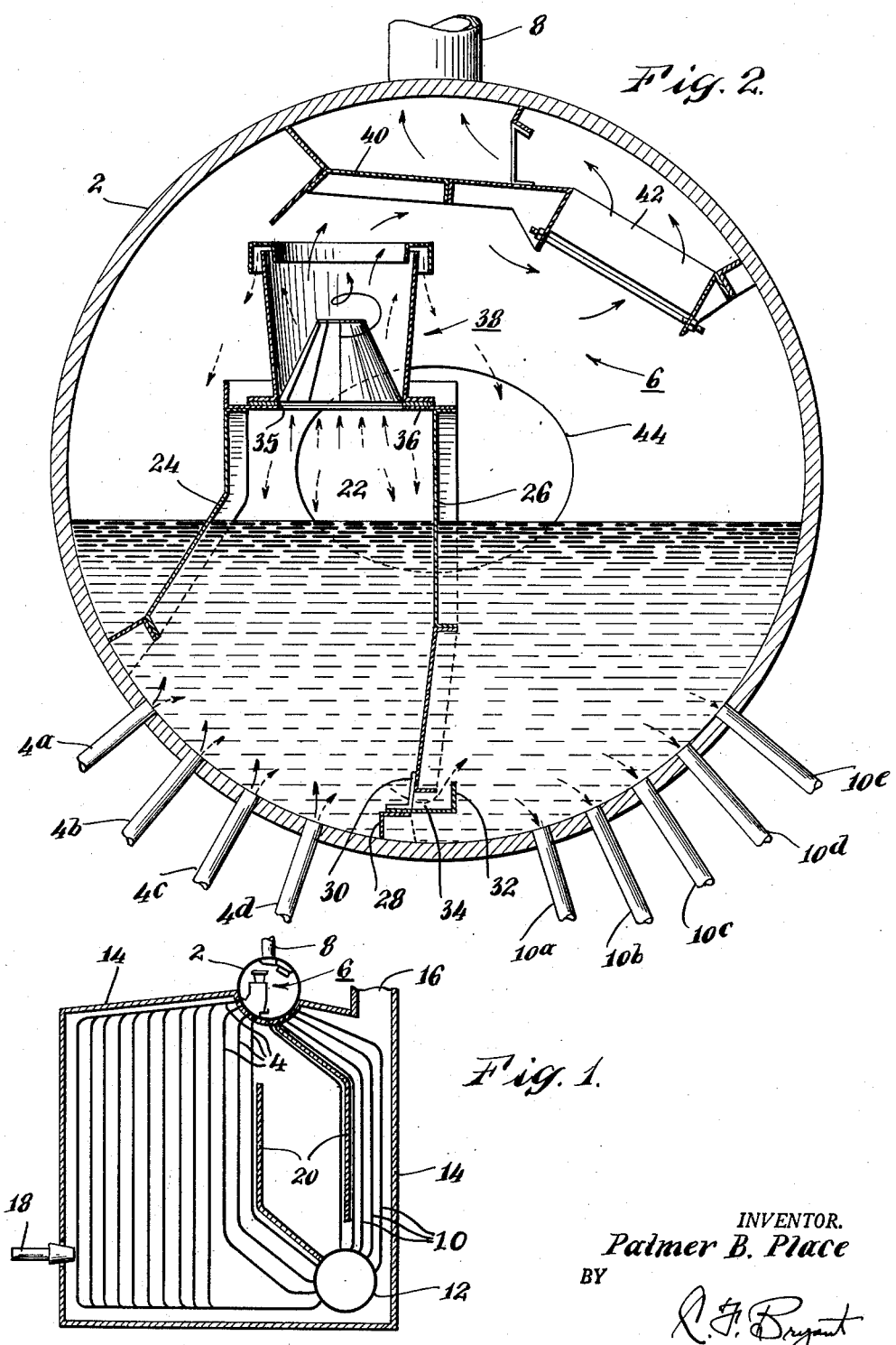

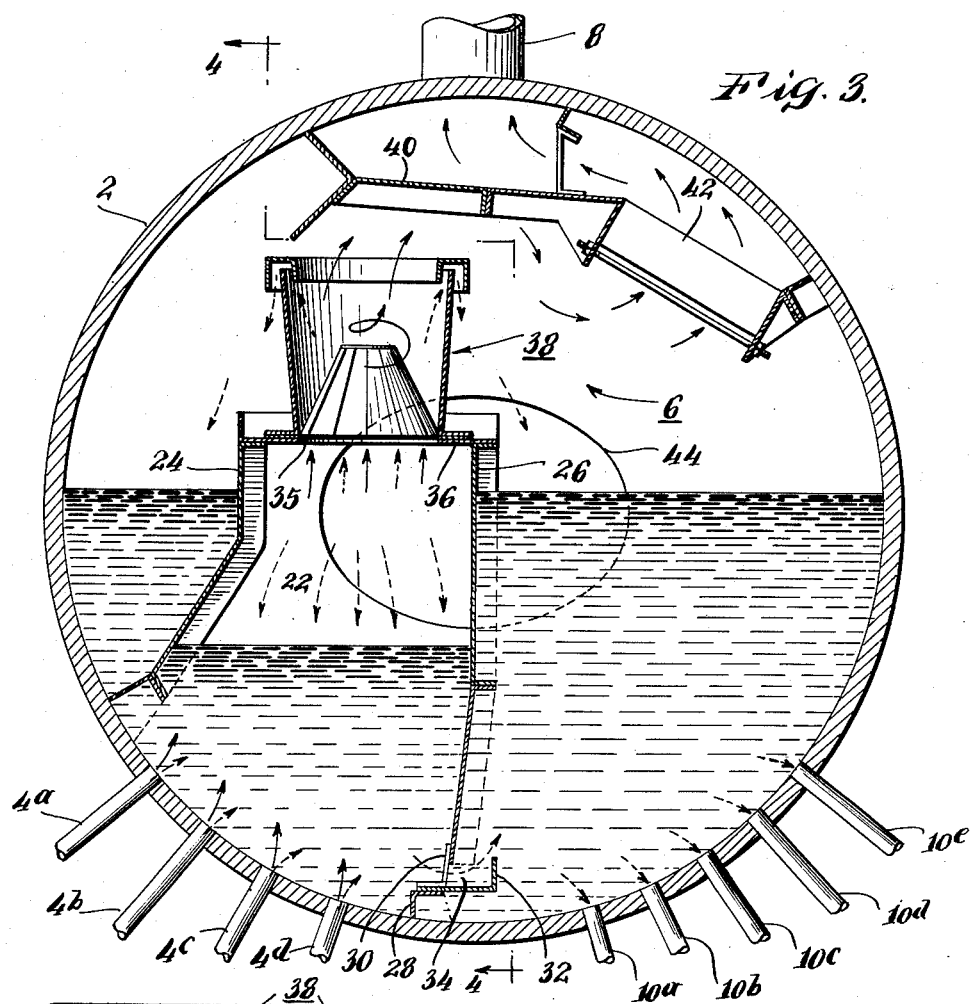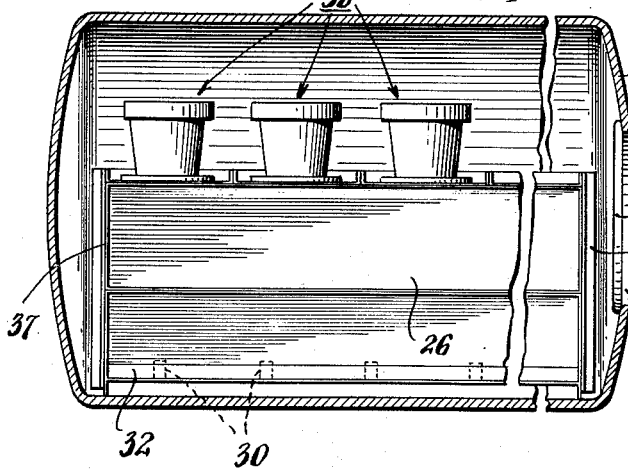

United States Patent Office 2,763,245
Patented Sept. 18, 1956

2,763,245

DRUM INTERNAL FOR LOW HEAD BOILER

Palmer B. Place, Chattanooga, Tenn., assignor to Combustion Engineering, Inc., New York, N. Y., a corporation of Delaware Application March 22, 1952, Serial No. 277,937

7 Claims. (Cl. 122—488)

My invention relates to drum internals for obtaining dry steam from the mixture of steam and water which enters the steam and water drum of a steam generator and has specific reference to such an internal including a centrifugal separator for use with steam generators of the low head type.

With the many and varied uses to which steam is put by industry today it is becoming increasingly important to efficiently and economically obtain uncontaminated steam, free of both water and foreign solid particles, by means of the ordinary low head industrial boiler. The steam generated in the steam generating tubes of such boilers is delivered to the steam and water drum mixed with circulating water, foam and sludge. As much as possible of these impurities must be eliminated from the steam before it can be used and this process of separation and purification is accomplished within said steam and water drum by a series of baffles and other mechanism commonly called drum internals.

It is now generally recognized in the steam generating art that drum internals employing centrifugal separators are superior to other type internals due to the twofold effect of such separators of breaking the tough skin of the steam bubbles (commonly referred to as foam) by impingement thereof with considerable force against the separator wall and of effecting a remarkably high degree of separation of the heavy liquid from the vapor by centrifugal action. However, it has heretofore been the practice to construct such internals so that all the steam and water entering the steam and water drum through the steam generating tubes passes through the separator resulting in a large pressure drop across said separators. This result is due to the fact that the pressure drop across a centrifugal separator is a function of the density of the fluid flowing therethrough with a larger pressure drop resulting with increased density. Because of this large pressure drop it has been impossible to satisfactorily use such drum internals in low head boilers having only natural circulation due to the adverse effect of said pressure drop on the boiler circulation. As is well understood in the art, natural boiler circulation is dependent upon the pressure differential existing between the downcomer tubes and the steam generating tubes which pressure differential is in turn dependent upon the difference in density of the liquid in said tubes. Since the density of the vapor-liquid mixture in the steam generating tubes is lower than the density of the liquid in the downcomer tubes the direction of circulation is from the steam and water drum downward through the downcomer tubes and upward through the steam generating tubes back into said steam and water drum. It is therefore apparent that if a drum internal of the type hereinbefore mentioned were used there would be a large pressure drop between the connection of the steam generating tubes and the connection of downcomer tubes with the steam and water drum which pressure drop would be in direct opposition to the pressure differential establishing the boiler circulation. In low head boilers this would result in a decrease in the boiler circulation which could not be tolerated.

In order to overcome these difficulties and reduce the pressure drop across drum internals employing centrifugal separators to a point where it will not adversely affect the circulation in low head boilers it is necessary to effect a primary separation (of a type involving no pressure drop) of the steam and water mixture entering the drum prior to passage of said mixture through said separator in order to appreciably reduce the density of the mixture entering and passing through said separator. This result is accomplished in a novel manner by the organization of my invention.

Broadly stated the object of my invention is to provide a drum internal of superior design, improved performance and increased efficiency especially adapted for use with low head boilers.

A more specific object of my invention is to provide a drum internal equipped with one or more centrifugal separators and having such a limited overall pressure drop that it may advantageously be used in low head boilers.

A still more specific object of my invention is to provide a drum internal especially adapted for use in low head boilers and which is provided with one or more centrifugal separators and a primary gravity separation chamber.

Another object of my invention is to provide a drum internal especially adapted for use in low head boilers and which is provided with one or more centrifugal separators and a primary gravity separation chamber so arranged that an increase in the pressure drop across said separators tends to effect an increase in the primary separation in said primary gravity separation chamber.

Other and further objects of my invention will become apparent to those skilled in the art from the detailed description thereof when taken in conjunction with the accompanying drawings wherein:

Figure 1 is a simplified schematic representation (in the nature of a vertical section) of a steam generating installation having a steam and water drum equipped with my improved drum internal.

Figure 2 is a transverse section of the steam and water drum of Fig. 1 enlarged to show how drum internals constructed in accordance with one embodiment of my invention are installed in said drum.

Figure 3 is a view similar to Fig. 2 showing a displacement of the water levels within the drum in response to a pressure drop across the separator.

Figure 4 is a longitudinal sectional view (to reduced scale) generally along line 4—4 of Fig. 3 showing the side by side placement of the separators within the drum.

Figure 5 is a partial sectional view taken along line 5—5 of Fig. 6 showing one form of separator which may be employed with my invention.

Figure 6 is a transverse sectional view along line 6—6 of Fig. 5.

Figure 7 is a partial sectional view taken along line 7—7 of Fig. 8 showing a modified form of separator which may be employed with my invention.

Figure 8 is a transverse sectional view taken along line 8—8 of Fig. 7.

Figure 9 is a sectional view taken along line 9—9 of Fig. 10 showing a further modified form of separator which may be employed with my invention.

Figure 10 is a transverse sectional view taken along line 10—10 of Fig. 9.

*The steam generator of Fig. 1*

In this generator steam and water mixtures are discharged into steam and water drum 2 from steam generating tubes 4 (including those making up the furnace walls) arranged in multiple longitudinal rows a—b—c—d (Figs. 2 and 3) along the lower left portion of said drum. Said mixtures are separated in said drum by drum internal 6 with the steam passing upwardly through outlet conduit 8 communicating with the top of said drum and the water passing downwardly through downcomer tubes 10 arranged in multiple longitudinal rows a—b—c—d—e (Figs. 2 and 3) along the lower right portion of said drum; said rows of steam generating and downcomer tubes extend lengthwise of drum 2 and are composed of a plurality of similar tubes. The lower ends of said tubes (4 and 10) are suitably connected to water drum 12, as shown, forming a complete fluid circuit between drums 2 and 12 through which the boiler water is caused to circulate.

Housing 14, having a flue outlet 16, encloses water drum 12 as well as tubes 4 and 10 and supports drum 2 upon the top thereof. Burner means (of any suitable type) herein diagrammatically illustrated as 18 supplies the fuel which is burned within said housing with the gases of combustion therefrom being directed via baffles 20 outwardly through said flue outlet 16.

In the illustrated generator, steam generating tubes 4 are located forwardly within said housing 14 adjacent the zone of combustion while the downcomer tubes 10 are located rearwardly of said housing remote from said zone of combustion resulting in a portion of the water in said tubes 4 changing to steam thereby reducing the density of the fluid in tubes 4 relative to that in downcomer tubes 10 whereby a natural circulation is established with the water flowing down through downcomer tubes 10 into water drum 12 and thence up through steam generating tubes 4 into steam and water drum 2.

*Steam and water drum 2 and drum internal 6*

Steam and water drum 2, shown in enlarged scale in Figs. 2 and 3, has a drum internal 6 disposed therein in such a manner relative to steam generating tubes 4, downcomer tubes 10 and outlet conduit 8 as to separate the water from the steam and water mixture entering said drum through steam generating tubes 4 with the water descending to the lower portion of said drum and passing downwardly through downcomers 10 and the steam rising to the upper portion of said drum and passing out through conduit 8.

Said drum internal comprises a plurality of partitions forming a compartment 22 enclosing the ends of steam generating tubes 4. Partition 24 forms the forward wall of said compartment 22 and has its lower edge secured in fluid tight engagement with the wall of the drum just above the point of entry of row a of tubes 4. Partition 26 forms the rearward wall of said compartment and has its lower edge secured adjacent the lowermost portion of drum 2 just below the point of entry of row d of said tubes 4 into said drum. Angled member 28, secured to the wall of drum 2, has a baffle 32 fixed to the upper surface thereof. The lower edge of partition 26 is fixedly supported in spaced relation to said baffle through the medium of securely anchored brackets 30. Longitudinal opening 34 between the lower edge of partition 26 and said baffle 32 establishes fluid communication between chamber 22 and the remainder of the interior of drum 2 at a point well below the normal water level in said drum as clearly indicated in Figs. 2 and 3. Horizontal partition 36 spans the uppermost edge of partitions 24 and 26 at a point well above the normal water level in said drum and forms the top or roof of said compartment 22. Said partition 36 has a series of longitudinally spaced openings 35 communicating with vertically disposed centrifugal separators 38 suitably secured to said partition as for example by means of flanges and bolts. End plates 37 (Fig. 4) sealably engage the ends of partitions 24, 26 and 36 and the wall of drum 2 completing the enclosure of compartment 22.

Baffle 40 is positioned directly above the outlet of separators 38 and is effective to laterally deflect the steam passing upwardly therethrough so that it passes first through drier 42, of any conventional construction, and then outwardly through conduit 8.

Drum 2 is provided with a manhole opening 44 in the end thereof through which the elements of drum internal 6 are passed in unassembled form into the interior of said drum. Removable cover 46 (Fig. 4) normally retains opening 44 closed.

While the illustrated drum internal is provided with three centrifugal separators 38 (Fig. 4) it is to be understood that this is by way of illustration only and that the number of centrifugal separators necessary in any particular installation depends upon the performance of the individual boiler in such installation.

*The separators of Figs. 5, 7 and 9*

While it is essential that the separator forming a part of the drum internal 6 is of the centrifugal type the details of the particular separator employed may vary considerably.

Figures 5, 7 and 9 disclose three types of centrifugal separators that have proven satisfactory.

The separator of Fig. 5 comprises an outwardly flared upright tube 48 having an outwardly projecting radial flange 50 adjacent the inlet thereof and a channeled skimmer 52 positioned adjacent the outlet end thereof. Said skimmer 52 receives the outlet end of tube 48 in spaced relation thereto and is fixedly secured to said tube by any suitable means (not shown).

A frusto-conical spinner is positioned within said tube 48 and has a plurality of circumferentially spaced curved blades 54 secured at their upper ends to circular plate 56 and at their lower ends to annular plate 58. Said annular plate 58 extends outwardly beneath and in complimentary relation to flange 50 of tube 48. A plurality of aligned openings are provided in flange 50 and annular plate 58 through which bolts 60 having nuts 61 are inserted for securing said separator to partition 36.

The separator of Fig. 7 is similar to that of Fig. 5 and comprises upright tubular member 62 with an outwardly projecting radial flange 64 adjacent the inlet thereof and a channeled skimmer 52' secured in any suitable manner in spaced relation to the outlet thereof.

An annular spinner is positioned within said tubular member 62 adjacent the inlet thereof and comprises a central cylindrical member 68 having closed ends, an outer ring member 70 radially spaced from said cylindrical member and having an outwardly projecting radial flange 72 complimentary to flange 64 of tube 62 and a plurality of circumferentially spaced inclined vanes 74 positioned in the annular space defined by ring 70 and cylindrical member 68 and secured to said ring and said cylindrical member. A plurality of aligned openings are provided in complimentary flanges 64 and 72 through which bolts 60 having nuts 61 are inserted for securing said separator to partition 36.

The separator of Fig. 9 comprises an inner upright tube 76 having an outwardly projecting radial flange 75 adjacent the inlet thereof with an outer tube 78 disposed about the upper portion in spaced concentric relation thereto deriving mechanical support therefrom through the medium of studs 80. Skimmer 82, secured to the outer end of tube 78 as by set screws 84, spans the annular space between tubes 76 and 78 and includes a flange portion projecting inwardly of the outlet edge of tube 76 in spaced relation thereto.

The spinner means for said separator of Fig. 9 includes a generally cylindrical cone piece 88 coaxially disposed within inner tube 76 intermediate the ends thereof and provided with closed ends except for breather openings 90. Said cone piece 88 defines an annular passage with respect to tube 76 and is supported within said tube by a plurality of circumferentially spaced inclined vanes 86 which span said annular passage.

Suitable holes are provided in flange 75 for the reception of bolts 60 as in the case of the previously described separators.

Operation

Assuming that the low head boiler typically illustrated in Fig. 1 is fired and in operation, the heat given off by the burning of the fuel supplied to said boiler through burner 18 heats the water in steam generating tubes 4 to a point where a portion of said water is changed to steam resulting in a reduction in the density of the fluid in tubes 4 relative to that in tubes 10, thereby causing the boiler water to circulate through drums 2 and 12 by flowing downward through downcomers 10 and upward through tubes 4. The steam and water mixture from tubes 4 enters compartment 22 of drum 2. Said mixture rises up through the water occupying the lower section of said compartment into the upper portion thereof located above said water. At this point primary separation of said mixture takes place with a large portion of the water in said mixture falling back into the lower section of said compartment from which it flows back into downcomers 10 through passage 34. This is the simplest type of gravity separation and involves no pressure drop.

The steam and water mixture, now of greatly reduced density relative to when it entered said compartment 22, passes from the upper portion of said compartment through openings 35 in partition 36 and into separator 38. In passing through said separator the mixture is spun with an increased velocity causing the heavy water particles as well as the solid impurities to be thrown outwardly against the inner wall of said separator while the steam remains centrally of said separator whereby a secondary separation of said mixture is obtained. As the flow proceeds upwardly through said separator the aforementioned water and impurities are skimmed from the separator wall and directed downwardly along the outside of said separator into the lower portion of the drum which communicates with downcomers 10 while the steam, now substantially dry except for a small amount of moisture in the form of spray, passes out of the central portion of said separator, strikes baffle 40 and is directed through drier 42 and out through conduit 8. The dotted arrows in Figs. 2, 3, 5, 7 and 9 indicate generally the flow of water while the solid arrows in said figures indicate generally the flow of steam.

The reduction in the density of the mixture passing through the centrifugal separators by means of the primary gravity separation thereof not only reduces the pressure drop across said separators to a point acceptable for low head boiler operation but it also improves the operation of said separators, since with decreased density the velocity of flow through said separators will be greater for any given pressure drop thereacross resulting in greater centrifugal force and accordingly improved separation.

Since compartment 22 is in communication with the remaining portion of the interior of drum 2 through opening 34 the pressure drop across separators 38 causes a displacement of the liquid level within said compartment relative to the liquid level outside of said compartment as is clearly evident from a comparison of Figs. 2 and 3. As the liquid level is lowered in said compartment 22 in response to an increase in pressure drop across said separator the amount of gravity separation taking place therein increases which in turn tends to reduce said increase in pressure drop thereby establishing a sort of counterbalance. Since the pressure drop across separator 38 cannot exceed the amount of the water seal for opening 34, safety of circulation of the boiler water is automatically assured.

Summary

It will thus be seen that I have provided a drum internal including a centrifugal separator having a sufficiently small pressure drop thereacross to enable said internal to be used in low head industrial boilers wherefore, for the first time, the advantages inherent in centrifugal separation may be realized in connection with such low head boilers without substantially affecting the circulation thereof; that I have provided a two stage separating arrangement the first stage of which is gravity, involving no pressure drop, and the second stage of which is centrifugal whereby a large portion of the water is separated from the steam and water mixture before it enters the centrifugal separator thereby maintaining a low pressure drop across said centrifugal separator and at the same time increasing the effectiveness of said separator; that I have provided a drum internal with a primary gravity separation chamber and a secondary separator of the centrifugal type so arranged that an increase in pressure drop across the centrifugal separator tends to increase the effectiveness of the gravity separation chamber and that I have provided a drum internal with safety means for limiting the pressure drop thereacross and accordingly the adverse effect of said pressure drop on the boiler circulation.

While I have illustrated and described a preferred embodiment of my drum internal together with three forms of centrifugal separators that may be used therewith it is to be understood that such is merely illustrative and not restrictive and that variations and modifications may be made therein without departing from the spirit and scope of the invention. I therefore do not wish to be limited to the precise details set forth but desire to avail myself of such changes and alterations as fall within the perview of my invention.

What I claim is:

1. A steam generator having a low circulating head and comprising in combination a steam and water drum, steam generating tubes connected to one section of the drum, downcomer tubes connected to another section of the drum and a steam outlet in the drum's upper portion; said drum having an internal that includes a partition extending generally longitudinally of said drum and dividing said drum into a first chamber into which said steam generating tubes lead and a second chamber from which said steam outlet and said downcomer tubes lead, said chambers being in fluid communication through a suitable opening adjacent the lowermost portion of said drum, said partition having an apertured section positioned a substantial distance above the normal water level in said drum thereby forming a gravity separation chamber providing for primary separation of the steam and water mixture entering said first chamber through said steam generating tubes; centrifugal separating means extending into the upper portion of said second chamber and communicating with said apertures whereby the steam and water mixture in passing from said gravity separation chamber to said second chamber passes through said centrifugal separating means thereby providing for secondary separation of said mixture said centrifugal separator means including means to impart a whirling motion to the steam and water mixture passing therethrough causing the water particles and solid impurities to be thrown to the outer portion of said whirling mixture while the steam remains centrally thereof and means effective to separate said water and impurities from said steam.

2. A steam generator having a low circulating head and comprising in combination a horizontally disposed cylindrical steam and water drum with a group of longitudinally arranged steam generating tubes connected to said drum at one side of a vertically disposed plane through the longitudinal center line thereof, a group of longitudinally arranged downcomer tubes connected to the lower portion of the drum at the other side of said plane and a steam outlet in the drum's upper portion; a partition longitudinally disposed within said drum and extending substantially the entire length thereof, one edge of said partition being secured to the wall of said drum in fluid tight engagement therewith at a point at said one side of said plane between the entrance of said steam generating tubes and said steam outlet and the other edge of said partition extending below the normal water level in said drum to a point adjacent the lowermost portion of said drum but spaced a predetermined distance from the wall thereof, said partition having a generally horizontal intermediate portion positioned a substantial distance above the normal water level in said drum and provided with at least one opening therethrough; end plates fluidly sealing the ends of said partition, said partition thus dividing said drum into a first chamber for receiving the steam and water mixture from said steam generating tubes and effecting a primary separation of said mixture by gravity and a second chamber having a steam space in the upper portion thereof and a water space in the lower portion thereof; vertically disposed centrifugal separating means projecting upwardly into the steam space of said second chamber and secured to said horizontal intermediate portion in communication with the opening therethrough, said centrifugal separator being operable to effect a secondary separation of the steam and water mixture passing from said first chamber through said opening into said second chamber; said separating means comprising a generally vertical elongated tube having a spinner disposed therein for imparting a rotary motion to the vapor and liquid mixture flowing therethrough and a skimmer spacedly positioned adjacent the outlet thereof for separating the liquid thrown outwardly against said tube from the vapor which remains nearer the center of said tube.

3. In a vapor and liquid drum for a vapor generator having inlets for a vapor and liquid mixture at one side of said drum, a plurality of outlets for liquid in the lower portion of the other side of said drum and a vapor outlet in the drum's upper portion; the combination of a drum internal comprising a baffle positioned longitudinally within said drum and extending from a point intermediate said inlets and the vapor outlet to a point spaced from the drum wall, substantially below the normal liquid level in the drum and intermediate said inlets and said outlets for liquid thereby forming a first chamber in direct communication with said inlets and a second chamber in direct communication with said outlets for liquid and the vapor outlet, said baffle having a portion extending substantially above the normal liquid level in the drum, which portion is provided with at least one opening therethrough; vertically disposed centrifugal separator means communicating with said opening and so arranged that a vapor-liquid mixture flows therethrough in passing from said first to said second chamber, said separator comprising an elongated tube, a spinner coaxially disposed within said tube and having a circular rim closely fitted within said tube, a cylindrical member spacedly centered within said rim and a plurality of circumferentially spaced inclined vanes positioned in the annular space between and secured to said rim and said cylindrical member, whereby the vapor and liquid mixture flowing therethrough receives a whirling motion causing the heavy liquid particles to be thrown outwardly against the tube wall for discharge over the tube's outlet edge, and a skimmer comprising an annular member with a channel cross section arranged to spacedly receive the outer edge of said tube thereby separating the liquid flowing adjacent the wall of said tube from the centrally located steam vapor.

4. In a vapor and liquid drum for a vapor generator having inlets for a vapor and liquid mixture at one side of said drum, a plurality of outlets for liquid in the lower portion of the other side of said drum and a vapor outlet in the drum's upper portion; the combination of a drum internal comprising a baffle positioned longitudinally within said drum and extending from a point intermediate said inlets and the vapor outlet to a point spaced from the drum wall, substantially below the normal liquid level in the drum and intermediate said inlets and said outlets for liquid thereby forming a first chamber in direct communication with said inlets and a second chamber in direct communication with said outlets for liquid and the vapor outlet, said baffle having a portion extending substantially above the normal liquid level in the drum, which portion is provided with at least one opening therethrough; vertically disposed centrifugal separator means communicating with said opening and so arranged that a vapor-liquid mixture flows therethrough in passing from said first to said second chamber, said separator comprising an elongated tube, a spinner means having a cone piece coaxially positioned within a portion of said tube and a plurality of circumferentially spaced inclined vanes disposed between and secured to said tube and said core piece, and a skimmer comprising an annular member with a channel cross section arranged to spacedly receive the outlet edge of said tube thereby separating the liquid flowing adjacent the wall of said tube from the centrally located steam vapor.

5. A steam and water drum for use with a low head steam generator, said drum having inlets for a steam and water mixture, outlets for the flow of boiler water from the drum, and a steam outlet in the drum's upper portion, said drum normally having a predetermined water level therein; a partition dividing said drum into a first chamber having a substantial portion of the volume thereof located above said normal water level and being in direct communication with said inlets and a second chamber having an upper steam space communicating directly with said steam outlet and a lower water space communicating directly with said outlets for boiler water, said partition forming a passageway adjacent the lower portion of the drum and substantially below the normal water level in said drum effective to establish fluid communication between said two chambers; centrifugal separator means extending upwardly into the steam space in the second chamber and communicating with the portion of said first chamber that is above the normal water level in said drum, said centrifugal separator means including means to impart a whirling motion to the steam and water mixture passing therethrough thus effecting an efficient separation of the heavy particles of said mixture from the lighter particles thereof and means for directing the thus separated particles in different directions to prevent substantially remixing of the same.

6. In a vapor and liquid drum for a vapor generator having inlets for a vapor and liquid mixture at one side of said drum, a plurality of outlets for liquid in the lower portion of the other side of said drum and a vapor outlet in the drum's upper portion; the combination of a drum internal comprising a baffle positioned longitudinally within said drum and extending from a point intermediate said inlets and the vapor outlet to a point spaced from the drum wall, substantially below the normal liquid level in the drum and intermediate said inlets and said outlets for liquid, thereby forming a first chamber in direct communication with said inlets and a second chamber in direct communication with said outlets for liquid and said vapor outlet with said chambers being in fluid communication at a point below the normal liquid level in said drum; said baffle having a portion extending substantially above the normal liquid level in the drum, which portion is provided with at least one opening therethrough; vertically disposed centrifugal separator means communicating with said opening and so arranged that a vapor liquid mixture flows therethrough in passing from said first to said second chamber, said separator comprising an elongated tube having a spinner disposed therein for imparting a rotary motion to the vapor and liquid mixture flowing therethrough and a skimmer spacedly positioned adjacent the outlet thereof for separating the liquid thrown outwardly against said tube from the vapor which remains nearer the center thereof.

7. In a vapor and liquid drum for a vapor generator having inlets for a vapor and liquid mixture at one side of said drum, a plurality of outlets for liquid in the lower portion of the other side of said drum and a vapor outlet in the drum's upper portion; the combination of a drum internal comprising a baffle positioned longitudinally within said drum and extending from a point intermediate said inlets and the vapor outlet to a point spaced from the drum wall, substantially below the normal liquid level in the drum and intermediate said inlets and said outlets for liquid, thereby forming a first chamber in direct communication with said inlets and a second chamber in direct communication with said outlets for liquid and said vapor outlet with said chambers being in fluid communication at a point below the normal liquid level in said drum; said baffle having a portion extending substantially above the normal liquid level in the drum, which portion is provided with at least one opening therethrough; vertically disposed centrifugal separator means communicating with said opening and so arranged that a vapor liquid mixture flows therethrough in passing from said first to said second chamber, said separator comprising an elongated outwardly flared tube, a frusto-conical spinner disposed within said tube and having a plurality of circumferentially spaced curved vanes, whereby a rotary motion is imparted to the vapor and liquid mixture flowing therethrough causing the heavy liquid particles to be thrown outwardly against the tube wall for discharge over the tube's outlet edge, and a skimmer comprising an annular member with a channel cross section arranged to spacedly receive the outer edge of said tube thereby separating the liquid flowing adjacent the wall of said tube from the centrally located vapor.

References Cited in the file of this patent

UNITED STATES PATENTS

| | | |
|---|---|---|
| 1,875,015 | Kerr | Aug. 30, 1932 |
| 1,931,544 | Hobbs | Oct. 24, 1933 |
| 2,058,239 | Kerr | Oct. 20, 1936 |
| 2,160,619 | Larrecq | May 30, 1939 |
| 2,232,265 | Place | Feb. 18, 1941 |
| 2,297,704 | Huge | Oct. 6, 1942 |
| 2,346,672 | Fletcher | Apr. 18, 1944 |
| 2,368,632 | Blizard | Feb. 6, 1945 |
| 2,594,490 | Patterson | Apr. 29, 1952 |

FOREIGN PATENTS

| | | |
|---|---|---|
| 303,303 | Great Britain | Jan. 3, 1929 |